United States Patent
Shimada et al.

(10) Patent No.: US 9,573,578 B2
(45) Date of Patent: Feb. 21, 2017

(54) ELECTRIC BRAKE DEVICE

(71) Applicant: HONDA MOTOR CO., LTD., Tokyo (JP)

(72) Inventors: Takashi Shimada, Wako (JP); Soichiro Ueura, Wako (JP); Kazuharu Kidera, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 14/326,870

(22) Filed: Jul. 9, 2014

(65) Prior Publication Data

US 2015/0021981 A1 Jan. 22, 2015

(30) Foreign Application Priority Data

Jul. 16, 2013 (JP) .................. 2013-147308

(51) Int. Cl.
*B60T 13/74* (2006.01)
*B60T 8/176* (2006.01)
(Continued)

(52) U.S. Cl.
CPC .............. *B60T 13/745* (2013.01); *B60T 8/176* (2013.01); *B60T 13/146* (2013.01); *B60T 13/58* (2013.01);
(Continued)

(58) Field of Classification Search
CPC ........ B60T 8/88; B60T 8/4081; B60T 13/662; B60T 13/745; B60T 8/92; B60T 8/885; B60T 13/66
(Continued)

(56) References Cited

U.S. PATENT DOCUMENTS 4,805,104 A * 2/1989 Kishimoto ................ B60T 8/58
  180/197
7,651,176 B2 1/2010 Inoue et al.
(Continued)

FOREIGN PATENT DOCUMENTS

JP 2008-143419 A 6/2008
JP 2010064658 A * 3/2010

OTHER PUBLICATIONS

Yamamoto (JP 2010064658) Translation.*

*Primary Examiner* — Bradley King
*Assistant Examiner* — Stephen Bowes
(74) *Attorney, Agent, or Firm* — Westerman, Hattori, Daniels & Adrian, LLP

(57) ABSTRACT

There is provided a brake system for vehicles, the brake system including: a slave cylinder S/C to generate a hydraulic pressure by an electric motor according to a braking operation by a driver; and a controller to decrease an operation amount of the slave cylinder S/C when an operation amount of the electric motor is maintained, then increase an operation amount of the slave cylinder S/C when a change occurs in an operation amount of the electric motor subsequently. The controller determines whether or not the phase currents Iu, Iv, Iw of the electric motor are in two-phase continuously energized state and the state remains for a certain time or longer. When the determination conditions are satisfied, the controller performs commutation control to generate commutation in the electric motor by reducing a target hydraulic pressure of the slave cylinder S/C.

16 Claims, 8 Drawing Sheets

(51) Int. Cl.
*B60T 13/58* (2006.01)
*B60T 13/66* (2006.01)
*B60T 13/14* (2006.01)
*B60T 13/68* (2006.01)

(52) U.S. Cl.
CPC .............. *B60T 13/66* (2013.01); *B60T 13/662* (2013.01); *B60T 13/686* (2013.01)

(58) Field of Classification Search
USPC ................ 318/139, 362, 366, 367, 368, 370
See application file for complete search history.

(56) References Cited

U.S. PATENT DOCUMENTS

2006/0087173 A1* 4/2006 Kajiyama ............. B60T 8/3655
    303/3
2007/0278855 A1* 12/2007 Hatano ................. B60T 8/4081
    303/116.1

* cited by examiner

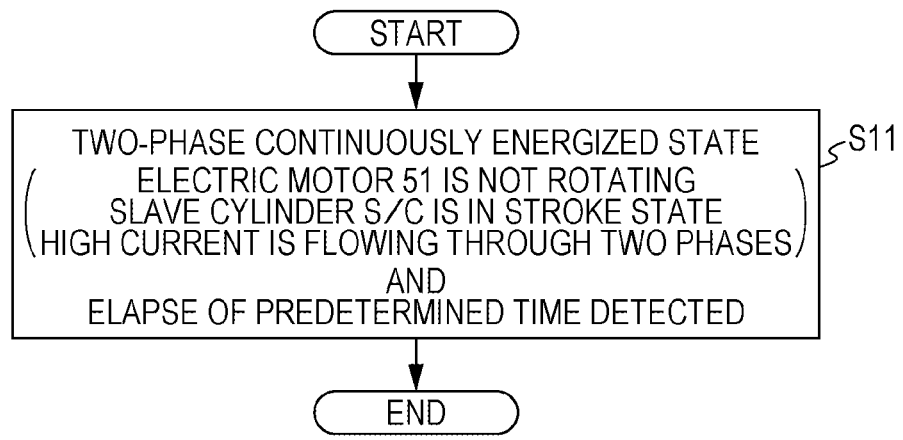
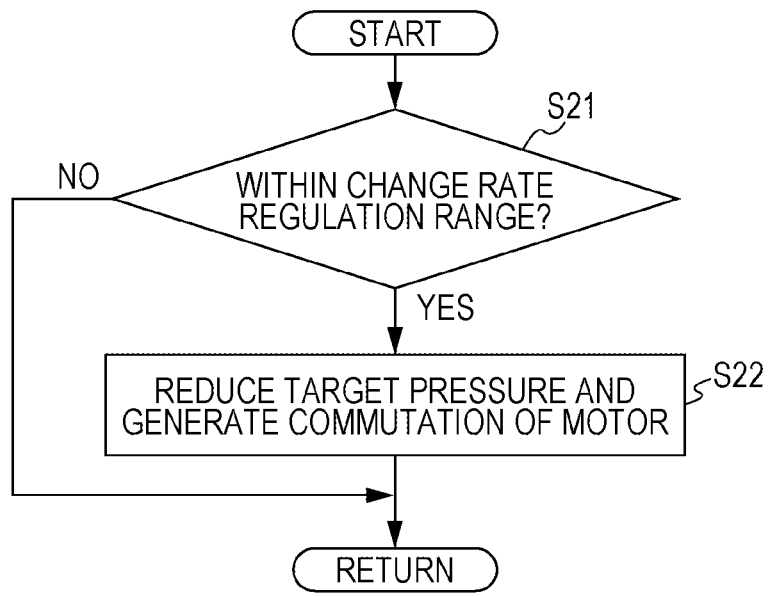

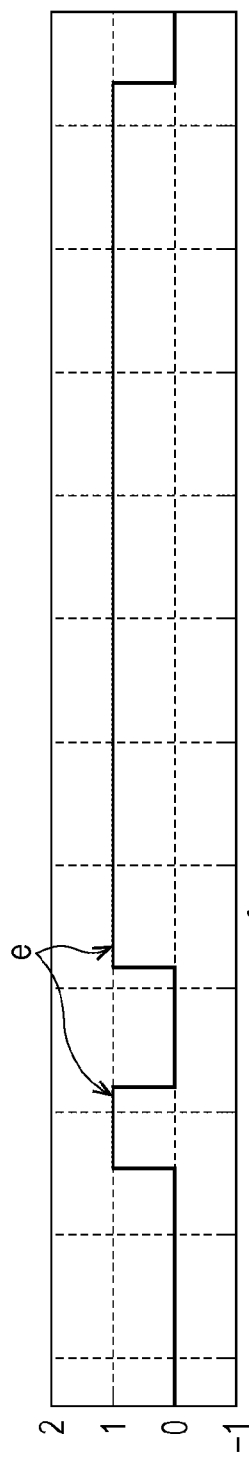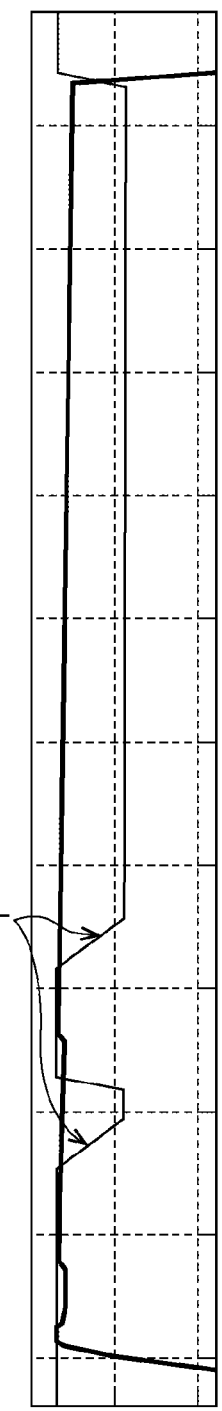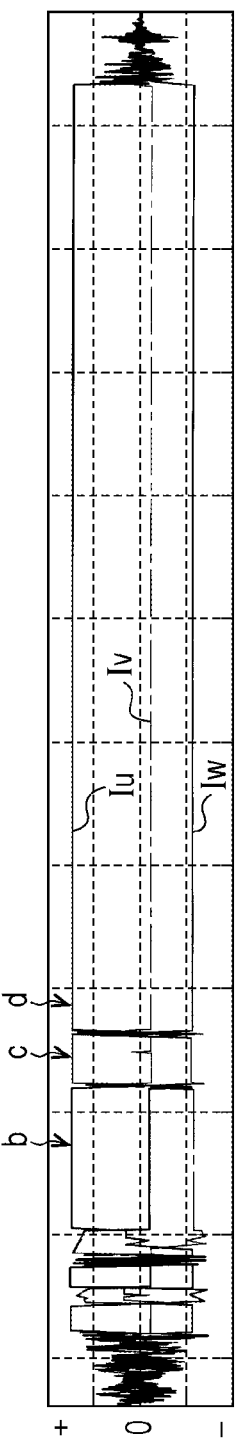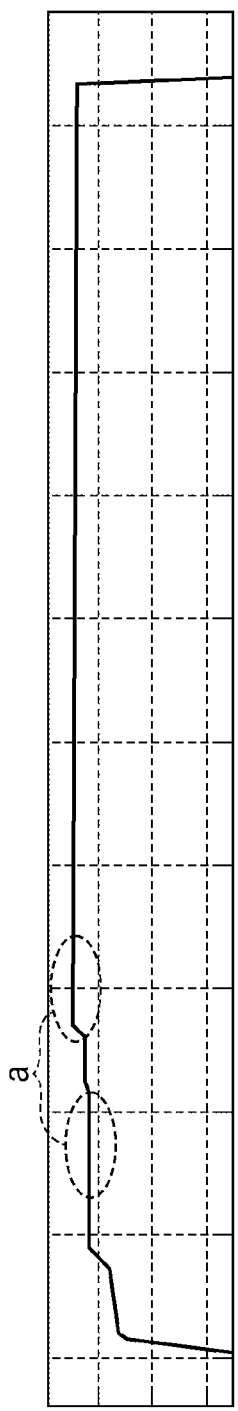

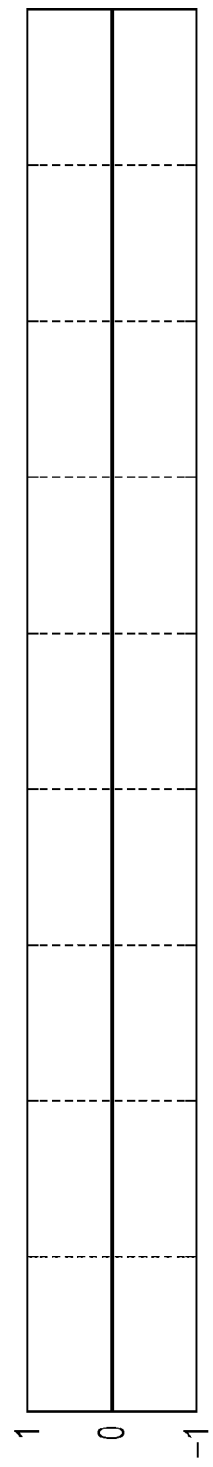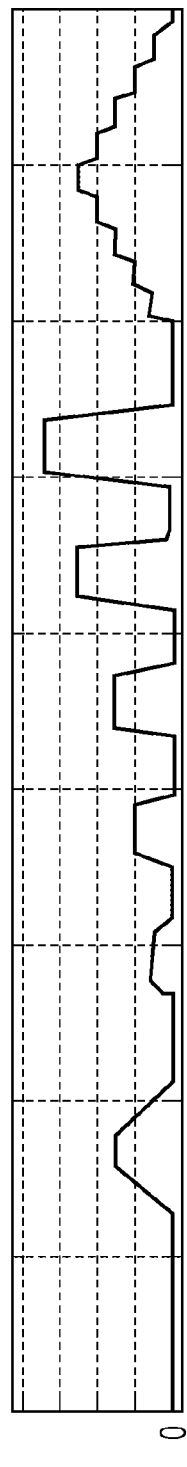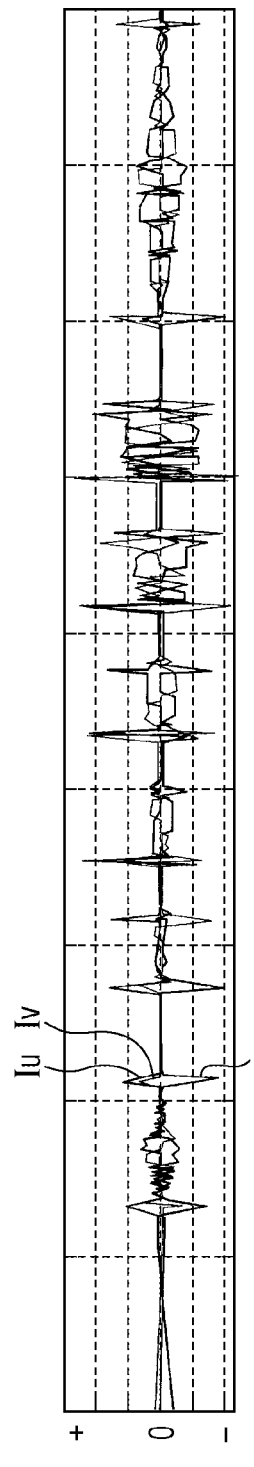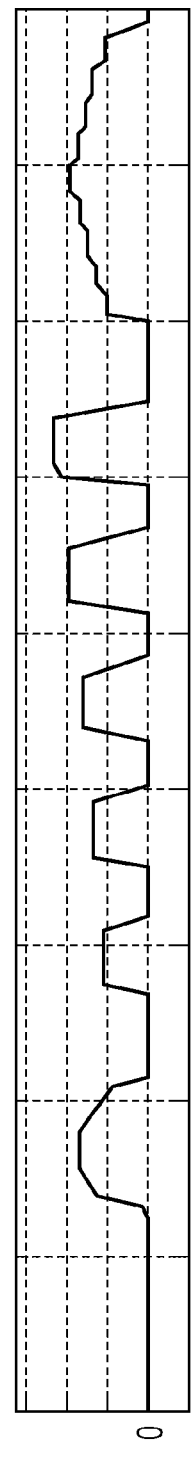
FIG. 9A
FIG. 9B
FIG. 9C
FIG. 9D
TIME OFFSET: 0

ELECTRIC BRAKE DEVICE

CROSS REFERENCES TO RELATED APPLICATIONS

The present application claims priority under 35 U.S.C. §119 to Japanese Patent Application No. 2013-147308, filed Jul. 16, 2013, entitled "Electric Brake Device." The contents of this application are incorporated herein by reference in their entirety.

TECHNICAL FIELD

The present disclosure relates to an electric brake device that can be applied to a by-wire brake system.

BACKGROUND

A by-wire electric brake system calculates a target brake pressure using a driver input such as an amount of pedal stroke and generates a hydraulic pressure by various actuators, thereby achieving a target hydraulic pressure. In the electric brake system, electric motors are used as the actuators for generating a brake pressure.

Japanese Unexamined Patent Application Publication No. 2008-143419 describes a brake device for vehicles, the brake device including: a master cylinder that receives an input of a brake operation of an driver, and a slave cylinder as an electric brake device that generates a brake hydraulic pressure based on an electrical signal according to the brake operation. In the slave cylinder of the brake device for vehicles, when an electric motor is driven, a piston moves forward via gear mechanism, and a brake hydraulic pressure is thereby generated in a hydraulic pressure chamber which is formed in front of the piston, and the brake hydraulic pressure is outputted to a hydraulic path via a port. As the electric motor, for example, a three-phase AC brushless motor is used which has three winding wires of three phases: U phase, V phase, and W phase. In the three-phase AC brushless motor, the current value and phase of phase currents Iu, Iv, Iw are controlled, the phase currents being caused to flow through the winding wires by a drive circuit which is not illustrated.

However, in such a conventional electric brake device, while a brake pressure is controlled with an electric motor, the electric motor may be locked and a current may continue to flow through the same two phases consecutively. In this case, when two-phase continuously energized state occurs, in which, for example, the electric motor is not rotating or a current is flowing through two phases, the temperature of only two phases rises and a failure or the like of parts due to heat generation may occur. In addition, when a phenomenon occurs, for example, the pattern of the phase currents Iu, Iv, Iw becomes constant, heat generation may occur in the electric motor, the phase currents being drive currents of the electric motor.

SUMMARY

The present disclosure has been made in view of such a situation, and provides an electric brake device capable of properly coping with heat generation of an electric motor in two-phase continuously energized state.

In order to solve the above-mentioned problem, a first aspect of the present disclosure provides an electric brake device including: an electric hydraulic pressure generating unit configured to generate a hydraulic pressure by an electric motor according to a braking operation by a driver; and a control unit configured to decrease an operation amount of the electric hydraulic pressure generating unit when an operation amount of the electric motor is maintained and to increase an operation amount of the electric hydraulic pressure generating unit when a change occurs in an operation amount of the electric motor subsequently.

According to the first aspect, even in two-phase continuously energized state, reduction in braking force due to heat generation of the electric motor can be prevented.

A second aspect of the present disclosure provides the electric brake device in which in a case where the operation amount of the electric hydraulic pressure generating unit is decreased, the control unit decreases the operation amount at a time when the operation amount reaches nearly a maximum operation amount.

According to the second aspect, when the operation amount of the electric hydraulic pressure generating unit is near a maximum value, heat generation is the highest and a driver is demanding higher braking force, and thus it is possible to prevent an effect on braking force due to the heat generation.

A third aspect of the present disclosure provides the electric brake device in which when anti-lock brake control is started, the control unit prohibits decrease in the operation amount of the electric hydraulic pressure generating unit.

According to the third aspect, decrease in the operation amount of the electric hydraulic pressure generating unit is prevented so as not to interfere with the ABS control because the hydraulic pressure is reduced by the ABS control when the ABS is started.

A fourth aspect of the present disclosure provides the electric brake device in which when an amount of brake operation of a driver is increased while the control unit decreasing the operation amount of the electric hydraulic pressure generating unit, the control unit prohibits decrease in the operation amount of the electric hydraulic pressure generating unit.

According to the fourth aspect, reduction in braking force can be prevented when the driver actually intends to apply brake, for example, by further stepping on the brake pedal.

A fifth aspect of the present disclosure provides the electric brake device in which elapse of a predetermined time or longer during which the operation amount of the electric motor is maintained is the case where the operation amount of the electric hydraulic pressure generating unit is to be decreased by the control unit, and the predetermined time is set to be longer when heat generation of the electric motor is low or a hydraulic pressure output of the electric hydraulic pressure generating unit is low.

According to the fifth aspect, the maintained time of the operation amount of the electric motor is set to be longer when the hydraulic pressure output of the electric hydraulic pressure generating unit is low, and thus reduction in braking force can be prevented when the hydraulic pressure output is low.

A sixth aspect of the present disclosure provides the electric brake device in which when it is detected that a drive current of the electric motor remains to be in two-phase continuously energized state for a certain time or longer, the control unit reduces a target pressure of the electric hydraulic pressure generating unit so as to generate commutation in the electric motor.

According to the sixth aspect, when it is detected that two-phase continuously energized state has remained for a certain time or longer, a target pressure of brake is reduced and the electric motor is reliably caused to rotate, thereby changing a current flowing phase (commutation) so as to be able to reduce heat generation. When commutation is detected, regulation of a driver's target pressure is released, and thus reduction in brake pressure more than necessary can be prevented.

A seventh aspect of the present disclosure provides the electric brake device in which the two-phase continuously energized state is a state one of: (i) the electric motor is not rotating; (ii) two phase currents out of three phase currents are high currents, the three phase currents each being the drive current of the electric motor; and (iii) a certain time has elapsed while a predetermined operation amount of the electric hydraulic pressure generating unit is being maintained.

According to the seventh aspect, two-phase continuously energized state can be detected, for example, by the observation that the electric motor is not rotating, a high current is flowing through two phases.

BRIEF DESCRIPTION OF THE DRAWINGS

The advantages of the disclosure will become apparent in the following description taken in conjunction with the following drawings.

FIG. 4 is a detailed flow chart for operation amount maintaining determination for an electric motor of the electric brake device according to the present embodiment.

FIG. 5 is a flow chart illustrating operation amount decrease processing performed on a slave cylinder S/C of the electric brake device according to the present embodiment.

FIGS. 8A to 8D are each a timing chart for explaining an operation of the two-phase continuous energization detection logic for the electric brake device according to the present embodiment.

FIGS. 9A to 9D are each a timing chart for explaining verification of the two-phase continuous energization detection logic for the electric brake device according to the present embodiment.

DETAILED DESCRIPTION

Hereinafter, an embodiment of the present disclosure will be described in detail with reference to the accompanying drawings.

Embodiment

Figure 1:
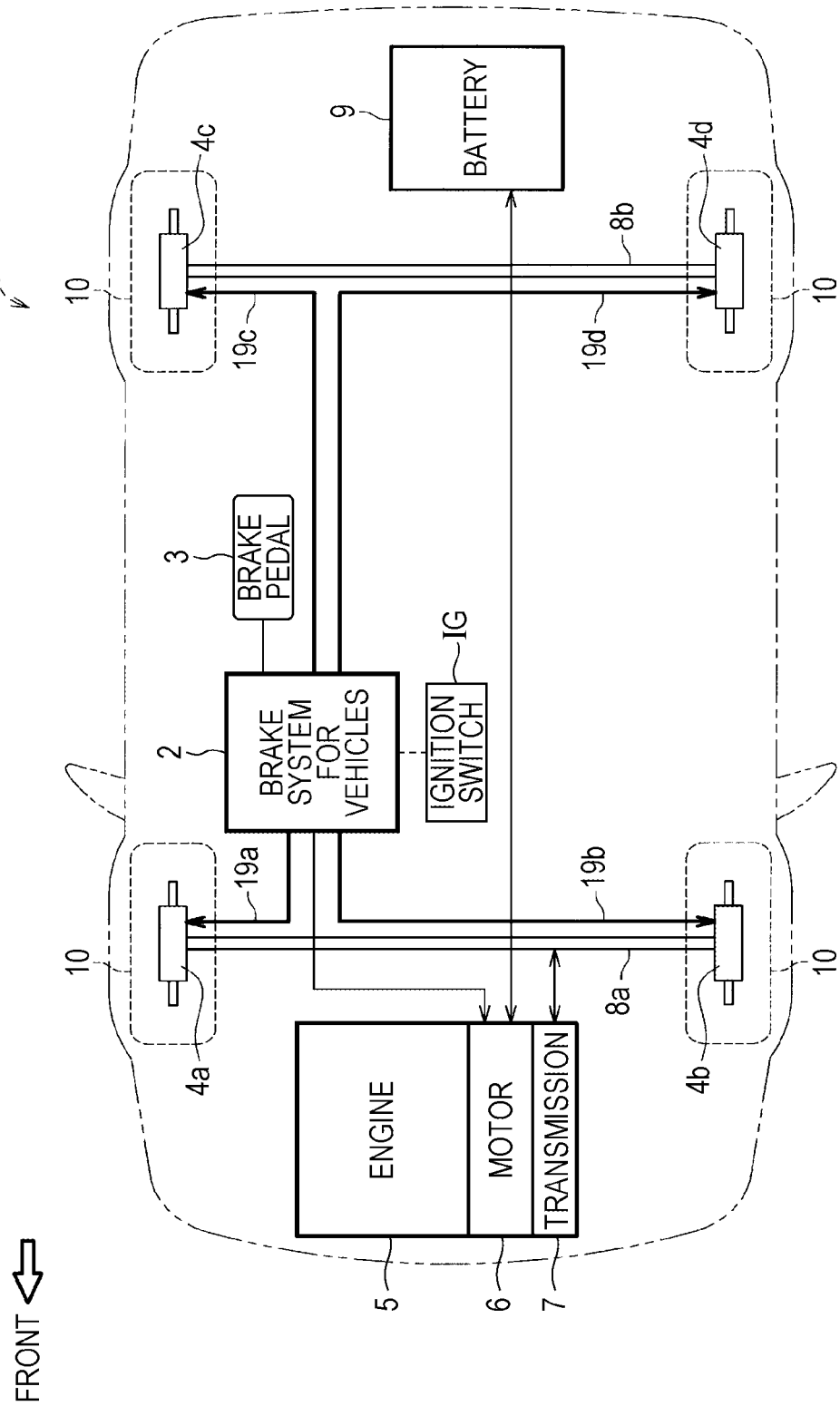
FIG. 1 is a schematic configuration diagram of a vehicle equipped with a brake device for vehicles according to an embodiment of the present disclosure.

FIG. 1 is a schematic configuration diagram of a vehicle equipped with a brake device for vehicles according to an embodiment of the present disclosure. The brake system for vehicles includes a by-wire brake system for normal use in which an electrical signal is sent to actuate a brake, and a conventional hydraulic brake system for fail safe in which hydraulic pressure is sent to actuate a brake. A brake system 2 (see FIGS. 1 and 2) for vehicles according to the present disclosure is a type of electric brake device that generates braking force by using a motor (drive motor) as a power generator and recovering some kinetic energy at the time of moving as electrical energy.

As illustrated in FIG. 1, a vehicle 1 has four wheels 10. Two front wheels 10 are connected to an axle 8a and two rear wheels 10 are connected to an axle 8b. The axle 8a receives a driving force via a transmission 7 to transmit it to the two front wheels 10 to rotate the front wheels, the driving force being generated by at least one of an engine 5 and a motor (electric motor) 6. The axle 8a transmits rotational energy (kinetic energy) of the two front wheels 10 to the transmission 7 as regenerative energy, and further transmits the energy to the motor 6 in which the regenerative energy is converted from kinetic energy to electrical energy and stored in a battery 9, thereby braking the two front wheels 10. That is, the two front wheels 10 and the axle 8a can be braked by the regenerative braking using the motor 6. It should be noted that the regenerative energy stored in the battery 9 is used when a driving force is generated by the motor 6. As illustrated in FIG. 1, in the present embodiment, description is given by taking a hybrid vehicle as an example of the vehicle 1. However, the vehicle 1 is not limited to a hybrid vehicle. That is, the brake system 2 for vehicles according to the present disclosure is also applicable to an electric vehicle which does not include the engine 5 of FIG. 1.

The four wheels 10 are provided with wheel cylinders 4a, 4b, 4c, and 4d, respectively. The wheel cylinder 4a is connected to a brake device (main body) 2 for vehicles via a hydraulic pressure path 19a. When the hydraulic pressure of the wheel cylinder 4a is increased by the brake device (main body) 2 for vehicles via the hydraulic pressure path 19a, the wheel cylinder 4a is actuated to brake a corresponding wheel 10. Similarly, the wheel cylinder 4b is connected to the brake device (main body) 2 for vehicles via the hydraulic pressure path 19b. When the hydraulic pressure of the wheel cylinder 4b is increased by the brake device (main body) 2 for vehicles via the hydraulic pressure path 19b, the wheel cylinder 4b is actuated to brake a corresponding wheel 10. The wheel cylinder 4c is also connected to the brake device (main body) 2 for vehicles via the hydraulic pressure path 19c. When the hydraulic pressure of the wheel cylinder 4c is increased by the brake device (main body) 2 for vehicles via the hydraulic pressure path 19c, the wheel cylinder 4c is actuated to brake a corresponding wheel 10. The wheel cylinder 4d is also connected to the brake device (main body) 2 for vehicles via the hydraulic pressure path 19d. When the hydraulic pressure of the wheel cylinder 4d is increased by the brake device (main body) 2 for vehicles via the hydraulic pressure path 19d, the wheel cylinder 4d is actuated to brake a corresponding wheel 10. That is, the four wheels 10 and the axles 8a, 8b can be braked by hydraulic braking force which is generated by using the brake device (main body) 2 for vehicles and the wheel cylinders 4a, 4b, 4c, 4d.

In this manner, braking control is performed on the two front wheels 10 and the axle 8a by the two braking systems: one is achieved by regenerative braking using the motor 6, and the other is achieved by hydraulic braking force which is generated by using the wheel cylinders 4a, 4b, 4c, 4d. The braking control is performed, for example, by the brake device (main body) 2 for vehicles, and specifically, distribution ratio between the regenerative braking force by regenerative braking and the hydraulic braking force by the wheel cylinders 4a, 4b, 4c, 4d is changed or the regenerative braking is stopped according to a vehicle speed.

In the present embodiment, as illustrated in FIG. 1, the wheel cylinder 4a is disposed on the right front wheel of the vehicle 1, the wheel cylinder 4b is disposed on the left front wheel of the vehicle 1, the wheel cylinder 4c is disposed on the right rear wheel of the vehicle 1, and the wheel cylinder 4d is disposed on the left rear wheel of the vehicle 1. However, the disposition is not limited to this.

The brake device (main body) 2 for vehicles is provided with a brake pedal 3 which is operated by a driver of the vehicle 1. The brake pedal 3 serves as an input unit for the brake device (main body) 2 for vehicles, and the wheel cylinders 4a, 4b, 4c, 4d serve as output units for the brake device. The vehicle 1 is started by turning on an ignition switch IG, and the brake system 2 for vehicles is also started at the same time. The vehicle 1 including the brake system 2 for vehicles is caused to stop the operation by turning off the ignition switch IG.

Figure 2:
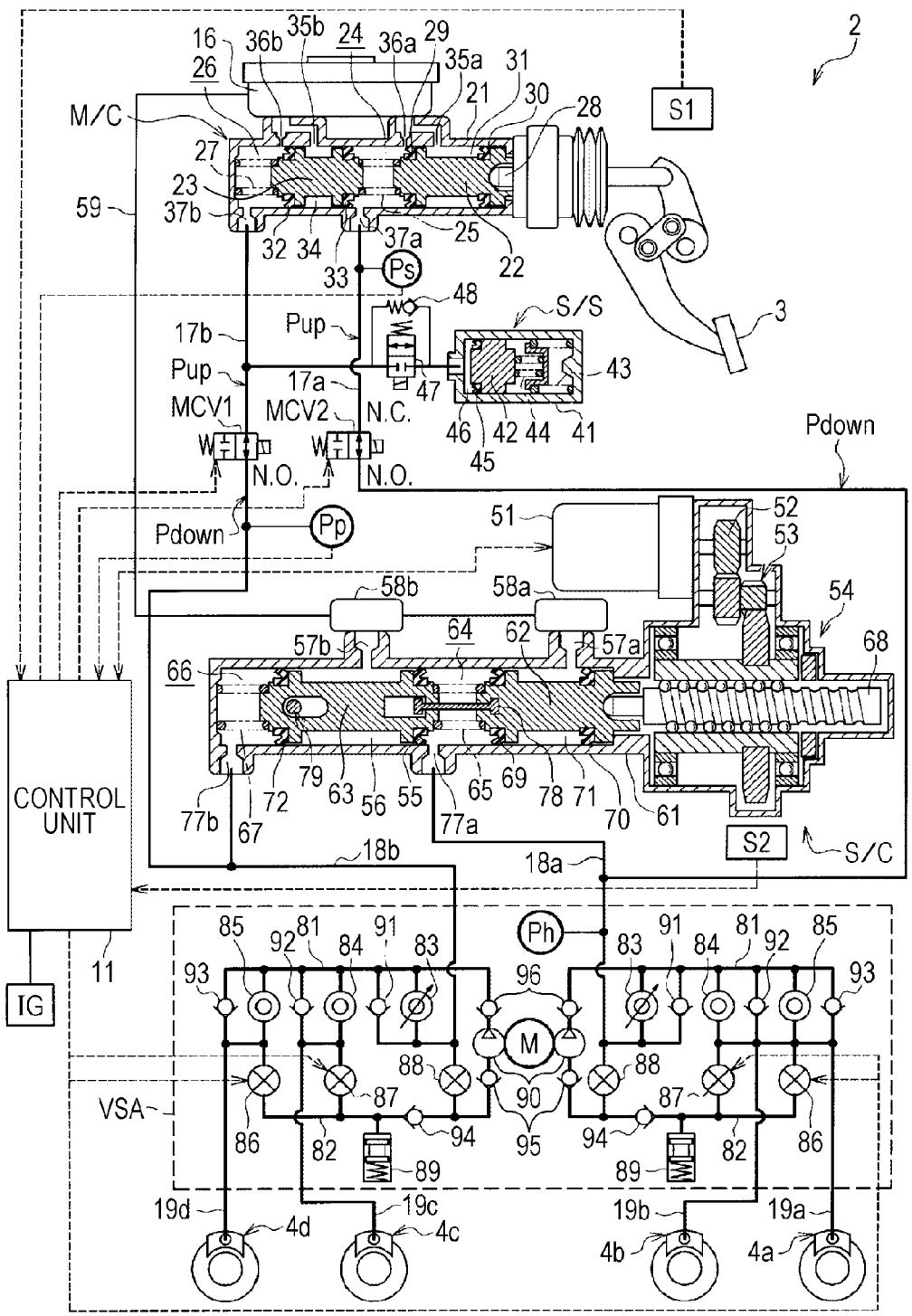
FIG. 2 is a schematic configuration diagram of the electric brake device according to the present embodiment.

FIG. 2 is a schematic configuration diagram of a brake system for vehicles which includes an electric brake device according to an embodiment of the present disclosure incorporated therein. FIG. 2 illustrates the brake system 2 for vehicles in a stop state of the brake system. As illustrated in FIG. 2, the brake system 2 for vehicles has the brake pedal 3, the wheel cylinders 4a, 4b, 4c, 4d, and the hydraulic pressure paths 19a, 19b, 19c, 19d. In addition, the brake system 2 for vehicles has a stroke sensor (operation amount detection unit) S1 that detects an amount of operation performed by the brake pedal 3; a tandem master cylinder (hydraulic pressure generating unit) M/C that is capable of generating a hydraulic pressure by a driver's operation of the brake pedal 3; hydraulic pressure paths 17a-18a-19a, 17a-18a-19b of a first hydraulic pressure system that connect between a second hydraulic pressure chamber 24 of the master cylinder M/C and the plurality of wheel cylinders 4a, 4b; and hydraulic pressure paths 17b-18b-19c, 17b-18b-19d of a second hydraulic pressure system that connect between a first hydraulic pressure chamber 26 of the master cylinder M/C and the plurality of wheel cylinders 4c, 4d.

The brake system 2 for vehicles has a slave cylinder S/C (electric hydraulic pressure generating unit). The slave cylinder S/C is disposed on the hydraulic pressure path 17a-18a of the first hydraulic pressure system and on the hydraulic pressure path 17b-18b of the second hydraulic pressure system. The slave cylinder S/C is capable of applying a downstream hydraulic pressure Pdown based on the operation amount of the brake pedal 3 detected by the stroke sensor S1, the downstream hydraulic pressure being downstream of the hydraulic pressure path 18a of the first hydraulic pressure system and the hydraulic pressure path 18b of the second hydraulic pressure system.

In addition, the brake system 2 for vehicles has master cut valves (normally open (N. O.) cut valves) MCV1, MCV2. The master cut valve MCV1 is disposed on the hydraulic pressure path 17b of the second hydraulic pressure system between the first hydraulic pressure chamber 26 of the master cylinder M/C and a first hydraulic pressure chamber 66 of the slave cylinder S/C. The master cut valve MCV2 is disposed on the hydraulic pressure path 17a of the first hydraulic pressure system between the second hydraulic pressure chamber 24 of the master cylinder M/C and a second hydraulic pressure chamber 64 of the slave cylinder S/C. The master cut valves MCV1, MCV2 are set in a valve closed state by make use of a closing force according to an amount of electricity which is applied in a close command receiving state in which a close command is received from the control unit 11, or are set in a valve open state in an open command receiving state in which an open command is received from the control unit 11.

The brake system 2 for vehicles has P sensor (pressure sensor, hydraulic pressure detection unit) Pp, Ps. The P sensor Pp is disposed on the hydraulic pressure path 17b of the second hydraulic pressure system nearer to the wheel cylinders 4c, 4d with respect to the master cut valve MCV1. The P sensor Pp detects (measures) a downstream hydraulic pressure Pdown nearer to the wheel cylinders 4c, 4d with respect to the master cut valve MCV1 of the hydraulic pressure path 17b of the second hydraulic pressure system. The P sensor Ps is disposed on the hydraulic pressure path 17a of the first hydraulic pressure system nearer to the master cylinder M/C with respect to the master cut valve MCV2. The P sensor Ps detects (measures) an upstream hydraulic pressure Pup nearer to the master cylinder M/C with respect to the master cut valve MCV2 of the hydraulic pressure path 17a of the first hydraulic pressure system.

As other primary components, the brake system 2 for vehicles has a stroke simulator S/S, a vehicle stability assist device (hereinafter referred to as a VSA device (VSA is a registered trademark)), and the control unit 11. The stroke simulator S/S is disposed on the hydraulic pressure path 17b of the second hydraulic pressure system nearer to the master cylinder M/C with respect to the master cut valve MCV1. The stroke simulator S/S is capable of absorbing brake fluid which is sent from the first hydraulic pressure chamber 26 of the master cylinder M/C. The VSA device, which supports stability of vehicle behavior, is disposed between the slave cylinder S/C and the wheel cylinders 4a, 4b, 4c, 4d, more specifically between the hydraulic pressure path 18a and the hydraulic pressure paths 19a, 19b of the first hydraulic pressure system. The VSA device is disposed between the hydraulic pressure path 18b and the hydraulic pressure paths 19c, 19d of the second hydraulic pressure system.

Control Unit 11

The control unit 11 has an electronic circuit board which includes a central processing unit (CPU), a read only memory (ROM) storing a control program, a random access memory (RAM), and an I/O section. The CPU reads the control program stored in the ROM and develops the program in the RAM to perform various processing. The control unit 11 controls the downstream hydraulic pressure Pdown of the master cut valves (normally open (N. O.) cut valves) MCV1, MCV2 based on the operation amount of the brake pedal 3 detected by the stroke sensor (brake operation amount detection unit) S1.

The control unit 11 determines whether or not phase currents Iu, Iv, Iw of an electric motor 51 are in two-phase continuously energized state (details will be described later) and the state has remained for a certain amount of time or longer. In the case where the determination conditions are satisfied, the control unit 11 performs commutation control to generate commutation in the electric motor 51 by reducing a target hydraulic pressure of the slave cylinder S/C. It should be noted that commutation refers to switching a phase (energization phase) through which a current flows from one path to another path in a circuit. It is preferable that it is selectable for the control unit 11 to allow the commutation control according to a brake pressure. For example, the control unit 11 does not allow the commutation control when the brake pressure is low. This is because when the brake pressure is low, heat generation of the electric motor 51 is not so much.

The control unit 11 may prohibit the commutation control being performed during the vehicle's stop in which change in braking force is likely to be conveyed to a driver even when the conditions for commutation control are satisfied.

The control unit 11 may decrease the operation amount of the slave cylinder S/C (electric hydraulic pressure generating unit) when the operation amount of the electric motor 51 is maintained for a predetermined time or longer. The predetermined time may be set to a longer time when heat generation of the electric motor 51 or the hydraulic pressure output of the slave cylinder S/C is lower.

Master Cylinder M/C

The master cylinder (hydraulic pressure generating unit) M/C includes a second piston 22 and a first piston 23 that are slidably fitted to a cylinder 21. A second return spring 25 is disposed in the second hydraulic pressure chamber 24 which is partitioned off in front of the second piston 22. A first return spring 27 is disposed in the first hydraulic pressure chamber 26 which is partitioned off in front of the first piston 23. The rear end of the second piston 22 is connected to the brake pedal 3 via a pushrod 28, and when a driver steps on the brake pedal 3, the first piston 23 and the second piston 22 move forward and an upstream hydraulic pressure Pup occurs in the first hydraulic pressure chamber 26 and the second hydraulic pressure chamber 24.

A second back chamber 31 is formed between a cup seal 29 and a cup seal 30 of the second piston 22 and a first back chamber 34 is formed between a cup seal 32 and a cup seal 33 of the first piston 23. In the cylinder 21, in the direction from the rear to the front, there are formed a supply port 35a which communicates with the second back chamber 31, a relief port 36a which is open to the second hydraulic pressure chamber 24 immediately in front of the cup seal 29, an output port 37a which is open to the second hydraulic pressure chamber 24, a supply port 35b which communicates with the first back chamber 34, a relief port 36b which is open to the first hydraulic pressure chamber 26 immediately in front of the cup seal 32, and an output port 37b which is open to the first hydraulic pressure chamber 26. The supply port 35a and the relief port 36a merge with each other and communicate with a reservoir 16. The supply port 35b and the relief port 36b merge with each other and communicate with the reservoir 16. The output port 37a is connected to the hydraulic pressure path (the first hydraulic pressure system) 17a. The output port 37b is connected to the hydraulic pressure path (the second hydraulic pressure system) 17b.

Stroke Simulator S/S

In the stroke simulator S/S, a second return spring 44 having a lower spring rate and a first return spring 43 having a higher spring rate are disposed in series to urge the piston 42 in order to increase feeling of stepping on the brake pedal 3 by setting a lower increase rate in the pedal reaction force in the first half of stepping on the brake pedal 3 and setting a higher increase rate in the pedal reaction force in the second half of stepping on the brake pedal 3. A hydraulic pressure chamber 46 is partitioned off on the opposite side of the piston 42 from the second return spring 44. The hydraulic pressure chamber 46 is connected to the hydraulic pressure path (the second hydraulic pressure system) 17b via a cut valve (normally closed (N. C.)) 47. A clack valve 48 is connected in parallel to the cut valve (normally closed) 47, the clack valve allowing brake fluid to flow from the hydraulic pressure chamber 46 to the hydraulic pressure path (the second hydraulic pressure system) 17b but preventing brake fluid to flow in the reverse direction. It should be noted that the piston 42 is provided with a cup seal 45 so that no brake fluid leaks from the hydraulic pressure chamber 46 through the cup seal 45 even when the piston 42 slides in the cylinder 41.

Slave Cylinder S/C

The slave cylinder S/C includes a second piston (slave piston) 62 and a first piston (slave piston) 63 that are slidably fitted to the cylinder 61. A second return spring 65 is disposed in the second hydraulic pressure chamber 64 which is partitioned off in front of the second piston 62. A first return spring 67 is disposed in the first hydraulic pressure chamber 66 which is partitioned off in front of the first piston 63. The rear end of the second piston 62 is connected to the electric motor (electric machine) 51 via a pushrod 68, a ball screw mechanism 54, a deceleration mechanism 53, and a gear 52, thereby forming a motor cylinder (52, 53, 54, 68). The slave cylinder S/C forms an electric hydraulic pressure generating unit that generates a hydraulic pressure by the electric motor 51 according to a driver's braking operation.

A stroke sensor (operation amount detection unit) S2 detects an operation amount of each of the first piston 63 and the second piston 62 (slave piston). The motor cylinder (52, 53, 54, 68) and the stroke sensor (operation amount detection unit) S2 constitute an electric actuator (52, 53, 54, 68, S2). When the electric motor 51 is caused to rotate by the braking control of the control unit 11, the pushrod 68 as well as the first piston 63 and the second piston 62 (slave piston) are moved forward (driven), and a downstream hydraulic pressure Pdown occurs in the first hydraulic pressure chamber 66 and the second hydraulic pressure chamber 64.

A second back chamber 71 is formed between a cup seal 69 and a cup seal 70 of the second piston 62, and a first back chamber 56 is formed between a cup seal 72 and a cup seal 55 of the first piston 63. In the cylinder 61, in the direction from the rear to the front, there are formed a return port 57a which communicates with the second back chamber 71, an output port 77a which communicates with the second hydraulic pressure chamber 64, a return port 57b which communicates with the first back chamber 56, an output port 77b which communicates with the first hydraulic pressure chamber 66. The return ports 57a and 57b are connected to the reservoir 16 via reservoirs 58a, 58b and a hydraulic path 59. The output port 77a communicates with the hydraulic pressure path 17a and the hydraulic pressure path 18a that are included in the first hydraulic pressure system. The output port 77b communicates with the hydraulic pressure path 17b and the hydraulic pressure path 18b that are included in the second hydraulic pressure system.

When the brake system 2 for vehicles has abnormality such as inoperability of the slave cylinder S/C, the master cut valves (normally open) MCV1, MCV2 are turned into a valve open state, and the cut valve (normally closed) 47 is turned into a valve closed state. A brake hydraulic pressure generated in the second hydraulic pressure chamber 24 of the master cylinder M/C is transmitted through the second hydraulic pressure chamber 64 of the slave cylinder S/C to actuate the wheel cylinders 4a, 4b of the first hydraulic pressure system. A brake hydraulic pressure generated in the first hydraulic pressure chamber 26 of the master cylinder M/C is transmitted through the first hydraulic pressure chamber 66 of the slave cylinder S/C to actuate the wheel cylinders 4c, 4d of the second hydraulic pressure system. At this point, if damage occurs in the hydraulic paths (the second hydraulic pressure system) 18b, 19c, 19d that connect between the first hydraulic pressure chamber 66 of the slave cylinder S/C and the wheel cylinders 4c, 4d of the second hydraulic pressure system, the hydraulic pressure of the first hydraulic pressure chamber 66 is lost and the first piston 63 moves forward, thereby causing the first piston 63 to be apart from the second piston 62. Consequently, the capacity of the second hydraulic pressure chamber 64 is increased and the brake hydraulic pressure supplied to the wheel cylinders 4a, 4b of the first hydraulic pressure system may be reduced. However, a regulation unit 78 regulates the maximum distance and the minimum distance between the first piston 63 and the second piston 62, and a regulation unit 79 regulates the sliding range of the first piston 63, and thus the capacity of the second hydraulic pressure chamber 64 is prevented from increasing even when the hydraulic pressure of the first hydraulic pressure chamber 66 is lost, thereby actuating the wheel cylinders 4a, 4b of the first hydraulic pressure system reliably and braking force can be ensured.

VSA Device

In the VSA device that supports stability of vehicle behavior, the first hydraulic pressure system ranging from the hydraulic pressure path 18a to the hydraulic pressure paths 19a, 19b, and the second hydraulic pressure system ranging from the hydraulic pressure path 18b to the hydraulic pressure paths 19c, 19d have the same structure. Thus, in order to facilitate understanding of the structure, corresponding members between the first hydraulic pressure system and the second hydraulic pressure system of the VSA device are denoted by the same reference symbols. In the following, the first hydraulic pressure system ranging from the hydraulic pressure path 18a to the hydraulic pressure paths 19a, 19b will be described as an example.

The VSA device includes a hydraulic pressure path 81 and a hydraulic pressure path 82 which are in common with the wheel cylinders 4a, 4b (4c, 4d); a regulator valve (normally open) 83 configured with a normally open solenoid valve with variable opening disposed between the hydraulic pressure path 18a (18b) and the hydraulic pressure path 81; a clack valve 91 which is disposed parallel to the regulator valve 83 to allow brake fluid to flow from the hydraulic pressure path 18a (18b) to the hydraulic pressure path 81; an in-valve (normally open) 85 configured with a normally open solenoid valve disposed between the hydraulic pressure path 81 and the hydraulic pressure path 19a (19d); a clack valve 93 which is disposed parallel to the in-valve 85 to allow brake fluid to flow from the hydraulic pressure path 19a (19d) to the hydraulic pressure path 81; an in-valve (normally open) 84 configured with a normally open solenoid valve disposed between the hydraulic pressure path 81 and the hydraulic pressure path 19b (19c); and a clack valve 92 which is disposed parallel to the in-valve 84 to allow brake fluid to flow from the hydraulic pressure path 19b (19c) to the hydraulic pressure path 81.

In addition, the VSA device includes an out-valve (normally closed) 86 which functions as a reducing valve and is configured with a normally closed solenoid valve disposed between the hydraulic pressure path 19a (19d) and the hydraulic pressure path 82; an out-valve (normally closed) 87 which functions as a reducing valve and is configured with a normally closed solenoid valve disposed between the hydraulic pressure path 19b (19c) and the hydraulic pressure path 82; a reservoir 89 which is connected to the hydraulic pressure path 82 and stores high-pressure brake fluid of the wheel cylinder when the out-valves 86, 87 are in a valve open state; a clack valve 94 which is disposed between the hydraulic pressure path 82 and the hydraulic pressure path 81 to allow brake fluid to flow from the hydraulic pressure path 82 to the hydraulic pressure path 81; a pump 90 which is disposed between the clack valve 94 and the hydraulic pressure path 81 to supply brake fluid from the hydraulic pressure path 82 to the hydraulic pressure path 81; and clack valves 95, 96 which are provided before and after the pump 90 to allow brake fluid to flow from the hydraulic pressure path 82 to the hydraulic pressure path 81; a motor (electric machine) M to drive the pump 90; and a suction valve (normally closed) 88 configured with a normally closed solenoid valve disposed between the middle position of the clack valve 94 and the clack valve 95, and the hydraulic pressure path 18a (18b).

The hydraulic pressure path 18a in the VSA device is provided with a P sensor (pressure sensor, hydraulic pressure detection unit) Ph that detects a downstream hydraulic pressure Pdown which is generated in the slave cylinder S/C (electric hydraulic pressure generating unit) and to be supplied to the wheel cylinders 4a, 4b (4c, 4d). Because the hydraulic pressure path 18a and the hydraulic pressure path 18b in the VSA device have the same or substantially the same pressure, the downstream hydraulic pressure Pdown on the wheel cylinder side to be supplied to the wheel cylinders 4c, 4d is substantially equivalent to the pressure detected by the P sensor (pressure sensor, hydraulic pressure detection unit) Ph.

The VSA device has, for example, the antilock brake system (ABS) function for preventing wheel lock at the time of braking, the traction control system (TCS) function for preventing free wheeling at the time of acceleration, and the electronic stability control (ESC) function for reducing skidding at the time of turning. The VSA device may have only the ABS function for preventing wheel lock at the time of braking.

Figure 3:
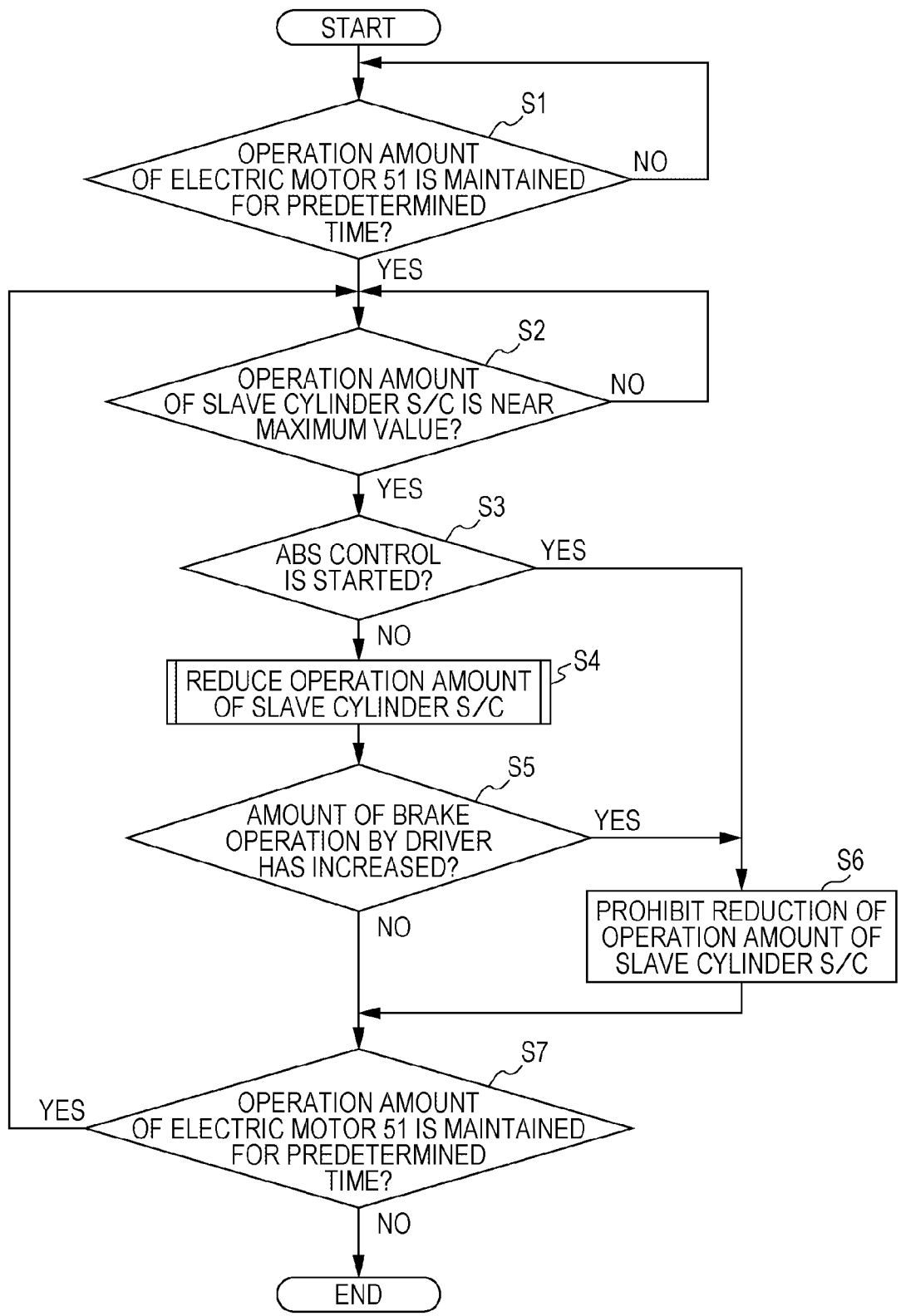
FIG. 3 is a flow chart illustrating motor commutation control performed by a control unit of the electric brake device according to the present embodiment.

Hereinafter, the motor commutation control operation of the brake system for vehicles configured in the aforementioned manner will be described. FIG. 3 is a flow chart illustrating the motor commutation control performed by the control unit 11. Symbol S indicates each step in the flow. The present flow is repeatedly executed as a control program at every predetermined timing by an electronic control unit (ECU) included in the control unit 11. The present flow may be executed by an electronic circuit instead of a control program according to the below-described control logic illustrated in FIGS. 6 and 7.

First, in step S1, the control unit 11 determines whether or not the operation amount of the electric motor 51 is maintained for a predetermined time. That is, the control unit 11 determines whether or not a state suggesting two-phase continuously energized state remains for a certain amount of time, the two-phase continuously energized state being such that the energization pattern of the electric motor 51 is constant, for example, that the slave cylinder S/C (electric hydraulic pressure generating unit) is in a stroke state (a state in which a hydraulic pressure is generated) although the electric motor 51 is not rotating. When the operation amount of the electric motor 51 is not maintained for the predetermined time (No in S1), the present flow is in stand-by in step S1. The details of step S1 will be described below with reference to FIG. 4. In the case where step S1 is implemented as a separate processing step, step S1 may not be included in the present flow.

When the operation amount of the electric motor 51 is maintained for the predetermined amount of time (Yes in S1), the present flow proceeds to step S2 and subsequent steps in which a target hydraulic pressure is reduced so as to generate commutation in the electric motor 51. Generation of commutation in the electric motor 51 prevents the electric motor 51 from being in a state in which the energization pattern of the electric motor 51 is constant. That is, the control unit 11 determines whether or not the operation amount of the slave cylinder S/C is near a maximum value. When the operation amount of the slave cylinder S/C is not near a maximum value, the present flow is in stand-by in step S2. When the operation amount of the slave cylinder S/C is near a maximum value, heat generation is the highest and a driver is demanding higher braking force, and thus it is possible to prevent reduction in braking force due to the heat generation at this timing.

When the operation amount of the slave cylinder S/C is near a maximum value in step S2 described above (Yes in S2), the control unit 11 determines whether or not ABS control is started. When the ABS control is not started (No in S3), the present flow proceeds to step S4, otherwise when the ABS control is started (Yes in S3), the present flow proceeds to step S6. When the present flow proceeds to step S6, decrease in the operation amount of the slave cylinder S/C is prevented so as not to interfere with the ABS control because the hydraulic pressure is reduced by the ABS control when ABS is started. When the ABS control is not started (No in S3), the control unit 11 decreases the operation amount of the slave cylinder S/C in step S4. The details of step S4 will be described below with reference to FIG. 5.

Subsequently, in step S5, the control unit 11 determines whether or not the amount of brake operation by a driver has increased. When the amount of brake operation by the driver has increased (Yes in S5), the present flow proceeds to step S6, otherwise when the amount of brake operation by the driver has not increased (No in S5), the present flow proceeds to step S7. An increase in the amount of brake operation by the driver occurs, for example when the driver further steps on the brake pedal 3 (see FIG. 3), and it is determined that the driver probably intended to apply brake. Thus, reduction in braking force is prevented. When the ABS control is started in step S3 described above (Yes in S3) or the amount of brake operation by the driver has increased in step S5 described above (Yes in S5), the control unit 11 prohibits decrease in the operation amount of the slave cylinder S/C in step S6 and the present flow proceeds to step S7.

When the amount of brake operation by the driver has not increased in step S5 described above (No in S5) or when decrease in the operation amount of the slave cylinder S/C is prohibited in step S6 described above, the control unit 11 determines whether or not the operation amount of the electric motor 51 is maintained for the predetermined time in step S7. When the operation amount of the electric motor 51 is maintained for the predetermined time (Yes in S7), the present flow returns to step S2 described above, otherwise when the operation amount of the electric motor 51 is not maintained for the predetermined time (No in S7), the present flow is terminated. When the amount of brake operation by the driver has decreased in step S5 described above, the processing of the present flow may be terminated.

FIG. 4 is a detailed flow chart for operation amount maintaining determination for the electric motor 51 in step S1 of FIG. 3. In step S11, the control unit 11 detects that two-phase continuously energized state has remained for a certain amount of time. The two-phase continuously energized state includes a state in which the slave cylinder S/C is in a stroke state or a high current flows through two phases of the electric motor 51 although the electric motor 51 is not rotating. That is, when the slave cylinder S/C is in a stroke state although the electric motor 51 is not rotating, it suggests that a high current flows through two phases of the electric motor 51. Conversely, when a high current flows through two phases of the electric motor 51, it suggests that the electric motor 51 is not rotating normally. In the present embodiment, when two-phase continuously energized state has remained for a certain amount of time, it is determined that the operation amount of the electric motor 51 is maintained for a predetermined time.

FIG. 5 is a flow chart illustrating the operation amount decrease processing performed on the slave cylinder S/C. The present flow is a subroutine of the operation amount decrease processing performed on the slave cylinder S/C in step S4 of FIG. 3. In step S21, the control unit 11 determines whether or not the operation amount of the slave cylinder S/C is within a change rate regulation range. Sudden reduction in braking force is prevented by keeping a change in the operation amount of the slave cylinder S/C within a predetermined change rate regulation range. When the change is not within the predetermined change rate regulation range (No in S21), the present flow is terminated and returns to step S4. When the change is within the predetermined change rate regulation range (Yes in S21), the control unit 11 reduces a target pressure of the slave cylinder S/C so as to generate commutation in the electric motor 51 in step S22. Generation of commutation in the electric motor 51 prevents the electric motor 51 from being in a state in which the energization pattern of the electric motor 51 is constant. Subsequently, the flow returns to step S4 of FIG. 3.

In the above, the motor commutation control performed by the control unit 11 has been described. The motor commutation control in the present embodiment may be achieved by the control logic 100, 200 of FIGS. 6 and 7 instead of the control program executed by the control unit 11. That is, two-phase continuous energization detection logic 100, 200 may be implemented on the control unit 11. It should be noted that each step in the processing flow of FIGS. 3 to 5 corresponds to a logic operation of a corresponding gate in accordance with the two-phase continuous energization detection logic 100, 200.

Example 1 of Two-phase Continuous Energization Detection Logic

Figure 6:
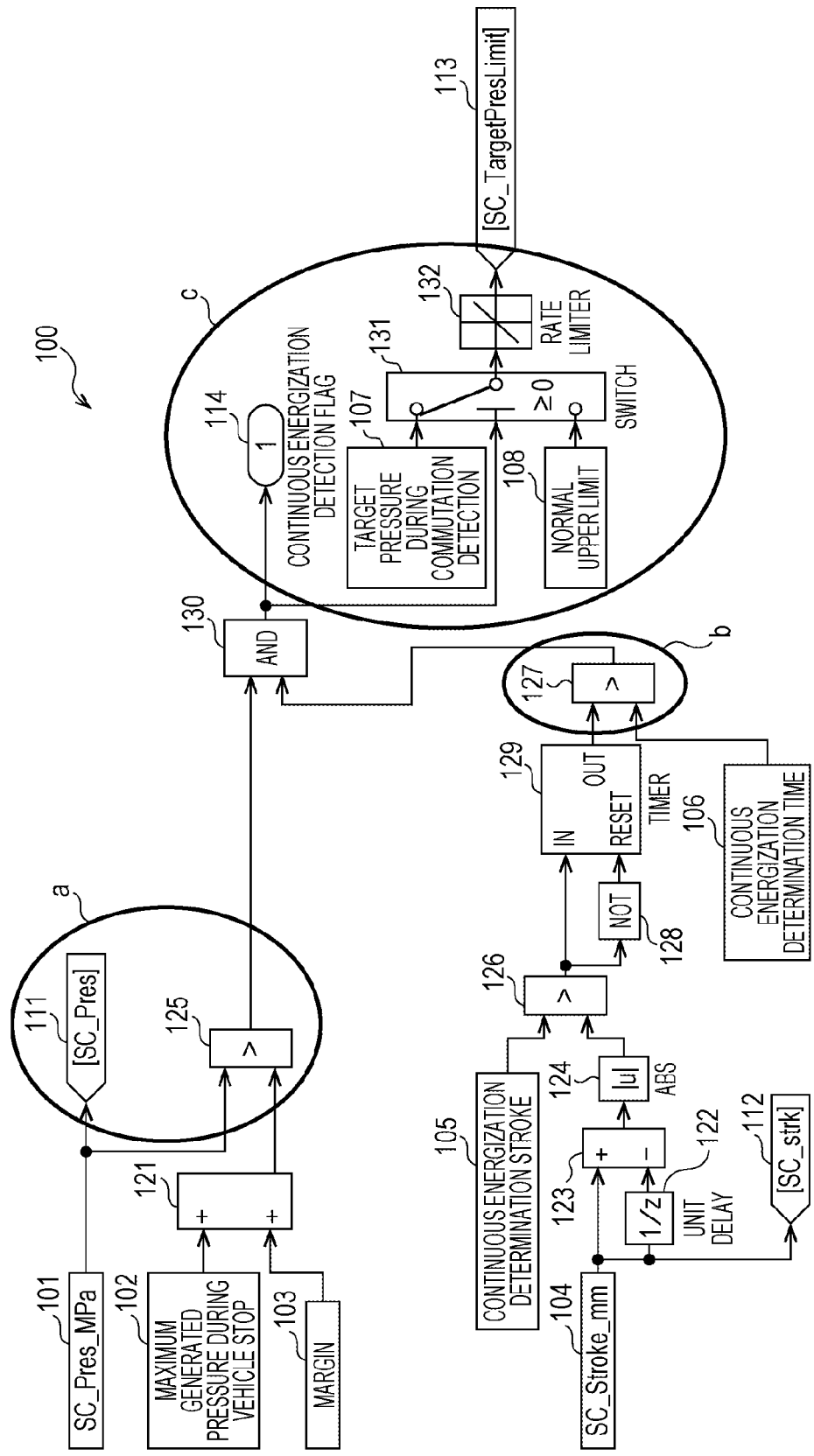
FIG. 6 is a diagram illustrating an example of two-phase continuous energization detection logic for the electric brake device according to the present embodiment.

FIG. 6 is a diagram illustrating an example of two-phase continuous energization detection logic. As illustrated in FIG. 6, two-phase continuous energization detection logic 100 includes a slave cylinder S/C hydraulic pressure input section 101, a maximum generated pressure during vehicle stop input section 102, a margin input section 103, a slave cylinder S/C stroke input section 104, a continuous energization determination stroke input section 105, a continuous energization determination time input section 106, a target pressure during commutation detection input section 107, a normal upper limit input section 108, a slave cylinder S/C hydraulic pressure output section 111, a slave cylinder S/C stroke output section 112, a slave cylinder S/C target hydraulic pressure output section 113, and a continuous energization detection flag 114. The input sections 101 to 108, the output sections 111 to 113, and the continuous energization detection flag 114 each include a register that temporarily stores input/output data and preset values. The two-phase continuous energization detection logic 100 includes an adder 121, a delay 122, a subtracter 123, an absolute value calculation unit 124, comparators 125 to 127, an inverter 128, a timer 129, an AND gate 130, a switch 131, and a limiter 132.

The slave cylinder S/C hydraulic pressure input section 101 stores a hydraulic pressure [SC_Pres_MPa] of the slave cylinder S/C. The maximum generated pressure during vehicle stop input section 102 stores a maximum pressure which is generated during a vehicle stop. The margin input section 103 stores approximately one-tenth to one-twentieth the maximum generated pressure during a vehicle stop. The slave cylinder S/C stroke input section 104 stores a stroke [SC_Stroke_mm] of the slave cylinder S/C. The continuous energization determination stroke input section 105 stores a continuous energization determination stroke. The continuous energization determination time input section 106 stores a continuous energization determination time. The target pressure during commutation detection input section 107 stores a target pressure of brake during commutation detection. The normal upper limit input section 108 stores an upper limit of the target pressure of brake at normal time.

The slave cylinder S/C hydraulic pressure output section 111 holds a slave cylinder S/C hydraulic pressure output [SC_Pres]. The slave cylinder S/C stroke output section 112 holds a slave cylinder S/C stroke output [SC_Strk]. The slave cylinder S/C target hydraulic pressure output section 113 holds a slave cylinder S/C target hydraulic output [SC_TargetPresLimit]. The continuous energization detection flag 114 sets a flag "1" at the time of continuous energization detection.

In the two-phase continuous energization detection logic 100 having the above configuration, a slave cylinder S/C hydraulic pressure [SC_Pres_MPa] is inputted to the comparator 125 and the slave cylinder S/C hydraulic pressure output unit 111. In addition, a maximum generated pressure during vehicle stop and a predetermined margin are inputted to the adder 121. The adder 121 adds a margin to the maximum generated pressure during vehicle stop, and outputs the sum to the comparator 125. The comparator 125 compares the slave cylinder S/C hydraulic pressure [SC_Pres_MPa] with the hydraulic pressure which is obtained by adding the margin to the maximum generated pressure during vehicle stop by the adder 121. When the slave cylinder S/C hydraulic pressure [SC_Pres_MPa] is higher than the hydraulic pressure which is obtained by adding the margin to the maximum generated pressure during vehicle stop, that is, when the slave cylinder S/C hydraulic pressure [SC_Pres_MPa] is decompressed by ABS control, a result of the comparison is outputted to the AND gate 130 (see S2 of FIG. 3). The slave cylinder S/C hydraulic pressure [SC_Pres_MPa] is held as a slave cylinder S/C hydraulic pressure output [SC_Pres] in the slave cylinder S/C hydraulic pressure output section 111. As indicated by the area a of FIG. 6, in order to ensure marketability, whether or not the commutation control (see S3 of FIG. 3) is allowed is selectable according to the brake pressure in the present embodiment. For example, the commutation control is not allowed to be operated with a lower brake pressure.

On the other hand, a slave cylinder S/C stroke [SC_Stroke_mm] is inputted to the delay 122, the subtracter 123, and the slave cylinder S/C stroke output section 112. The slave cylinder S/C stroke [SC_Stroke_mm] is held as a slave cylinder S/C stroke output [SC_Strk] in the slave cylinder S/C stroke output section 112. The subtracter 123 subtracts a slave cylinder S/C stroke [SC_Stroke_mm] from the inputted slave cylinder S/C stroke [SC_Stroke_mm], the slave cylinder S/C stroke including a delay added by the delay 122.

The absolute value calculation unit 124 calculates the absolute value of an output from the subtracter 123 and outputs the absolute value to the comparator 126. The comparator 126 compares a continuous energization determination stroke with the output (the absolute value of the slave cylinder S/C stroke) of the absolute value calculation unit 124. When the output of the absolute value calculation unit 124 is greater than the continuous energization determination stroke, that is, when the slave cylinder S/C has a predetermined stroke greater than the continuous energization determination stroke (see S2 of FIG. 3), a determination signal is outputted to input terminal In of the timer 129 and reset terminal Reset of the timer 129 via the inverter 128.

In this manner, the timer 129 starts to clock time. The comparator 127 compares an output time of the timer 129 with the continuous energization determination time. When the output time of the timer 129 reaches the continuous energization determination time, the comparator 127 outputs a result of the comparison to the AND gate 130. As indicated by the area b of FIG. 6, in the present embodiment, two-phase continuous energization, that is, that the electric motor 51 is stuck is detected when the stroke state of the slave cylinder S/C remains for a certain amount of time (see S11 of FIG. 4).

When the slave cylinder S/C hydraulic pressure [SC_Pres_MPa] is higher than the hydraulic pressure which is obtained by adding the margin to the maximum generated pressure during vehicle stop, and the absolute value of the slave cylinder S/C stroke is greater than the continuous energization determination stroke, the AND gate 130 inputs a continuous energization detection "1" to the input terminal of the switch 131 as well as the continuous energization detection flag 114. Upon receiving the input, the continuous energization detection flag 114 sets a flag "1" when continuous energization is detected.

The switch 131 receives inputs of a target pressure of brake during commutation detection and an upper limit of the target pressure of brake at normal time. The switch 131 outputs one of the above-mentioned inputs based on the continuous energization detection from the AND gate 130 in a switchable manner. The switch 131 outputs a target pressure during commutation detection in the case of during detection of commutation or outputs a normal upper limit target pressure in the case of normal time in a switchable manner.

The limiter 132 performs rate limiting in the following manner. When the target pressure selected by the switch 131 is within a predetermined range, the limiter 132 outputs a value proportional to an input value of the target pressure. On the other hand, when the target pressure is out of the predetermined range (other than threshold values), the limiter 132 outputs a predetermined value which indicates a saturated value. The slave cylinder S/C target hydraulic pressure output section 113 holds a slave cylinder S/C target hydraulic pressure output [SC_TargetPresLimit].

As indicated by the area c of FIG. 6, in the present embodiment, selection is made between a target pressure during detection of continuous energization and a normal target pressure while the change rate is being regulated by the rate limiting. The target pressure during detection of continuous energization is reduced so as to generate commutation in the electric motor 51 (see S21, S22 of FIG. 5).

Simultaneously with the generation of commutation, regulation of the target pressure is released.

Example 2 of Two-phase Continuous Energization Detection Logic

Figure 7:
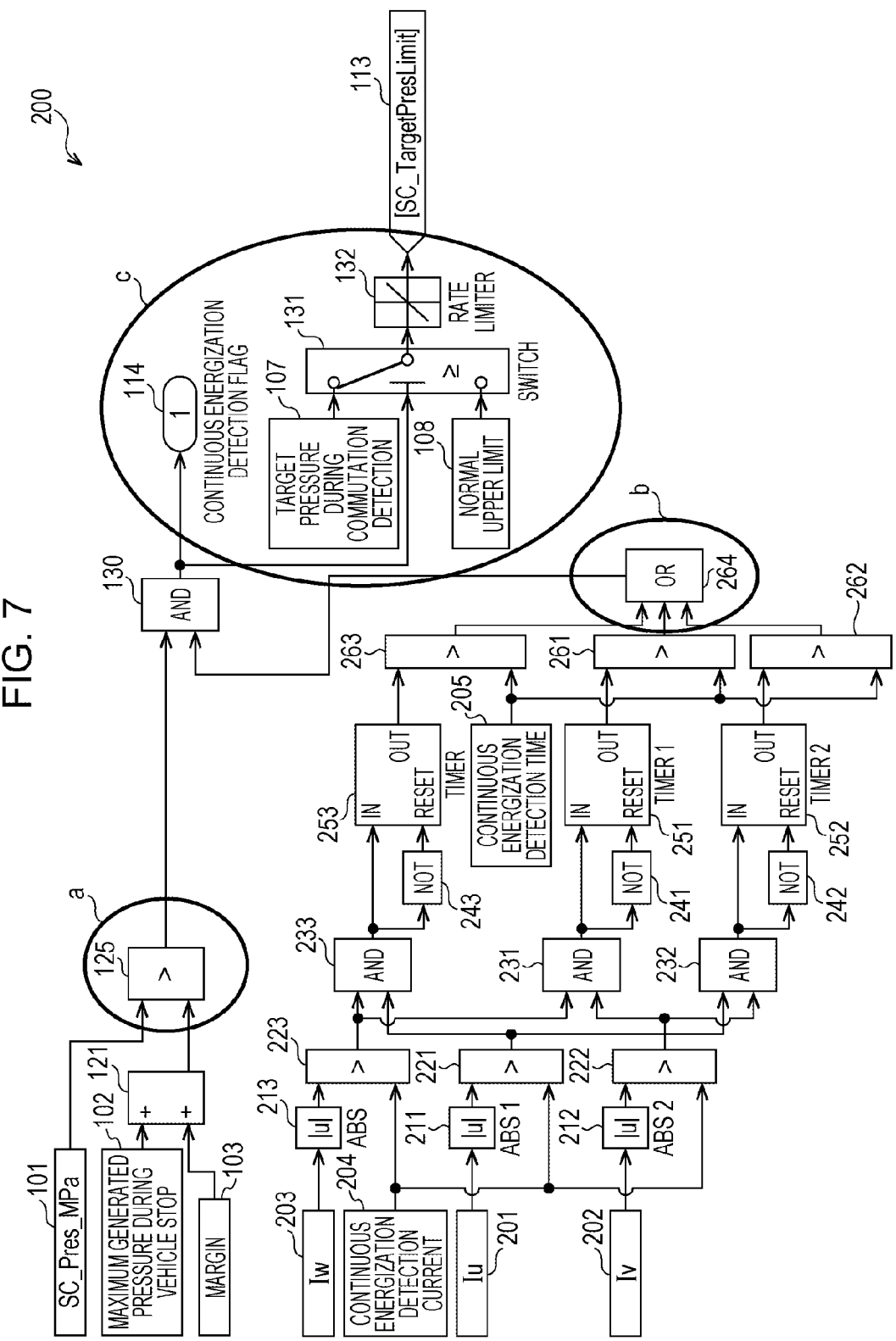
FIG. 7 is a diagram illustrating another example of two-phase continuous energization detection logic for the electric brake device according to the present embodiment.

FIG. 7 is a diagram illustrating another example of two-phase continuous energization detection logic. The same components as those in the control logic of FIG. 6 are denoted by the same symbols. As illustrated in FIG. 7, the two-phase continuous energization detection logic 200 includes a slave cylinder S/C hydraulic pressure input section 101, a maximum generated pressure during vehicle stop input section 102, a margin input section 103, U-phase current Iu input section 201, V-phase current Iv input section 202, W-phase current Iw input section 203, a continuous energization detection current input section 204, a continuous energization detection time input section 205, a slave cylinder S/C target hydraulic pressure output section 113, and a continuous energization detection flag 114. The input sections 201 to 205, the slave cylinder S/C target hydraulic pressure output section 113, and the continuous energization detection flag 114 each include a register that temporarily stores input/output data and preset values. Hereinafter U-phase current Iu, V-phase current Iv, and W-phase current Iw of the electric motor 51 (see FIG. 2) are simply referred to as phase current Iu, phase current Iv, and phase current Iwp, respectively. The two-phase continuous energization detection logic 200 also includes an adder 121, absolute value calculation units 211 to 213, comparators 125, 221 to 223, 261 to 263, AND gates 130, 231 to 233, inverters 241 to 243, timers 251 to 253, and an OR gate 264.

The phase current Iu input section 201 stores a phase current Iu of the electric motor 51. The phase current Iv input section 202 stores a phase current Iv of the electric motor 51. The phase current Iw input section 203 stores a phase current Iw of the electric motor 51. The continuous energization detection current input section 204 stores a preset continuous energization detection current. The continuous energization detection time input section 205 stores a preset continuous energization detection time.

In the two-phase continuous energization detection logic 200 having the above configuration, a slave cylinder S/C hydraulic pressure [SC_Pres_MPa] is inputted to the comparator 125 and the slave cylinder S/C hydraulic pressure output unit 111. In addition, a maximum generated pressure during vehicle stop and a predetermined margin are inputted to the adder 121. The adder 121 adds a margin to the maximum generated pressure during vehicle stop, and outputs the sum to the comparator 125. The comparator 125 compares the slave cylinder S/C hydraulic pressure [SC_Pres_MPa] with the hydraulic pressure which is obtained by adding the margin to the maximum generated pressure during vehicle stop by the adder 121. When the slave cylinder S/C hydraulic pressure [SC_Pres_MPa] is higher than the hydraulic pressure which is obtained by adding the margin to the maximum generated pressure during vehicle stop, that is, when the slave cylinder S/C hydraulic pressure [SC_Pres_MPa] is decompressed by ABS control, a result of the comparison is outputted to the AND gate 130 (see S2 of FIG. 3). The slave cylinder S/C hydraulic pressure [SC_Pres_MPa] is held as a slave cylinder S/C hydraulic pressure output [SC_Pres] in the slave cylinder S/C hydraulic pressure output section 111.

As indicated by the area a of FIG. 7, whether or not the commutation control is allowed (see S3 of FIG. 3) is selectable according to the brake pressure in the present embodiment. For example, the commutation control is not allowed to be operated with a low brake pressure (see S5, S6 of FIG. 3), thereby ensuring marketability.

Meanwhile, the phase currents Iu Iv, Iw of the electric motor 51 (see FIG. 2) are inputted to one input terminals of the comparators 221 to 223 via the absolute value calculation units 211 to 213, respectively, and the continuous energization detection current is inputted to the other input terminals of the comparators 221 to 223. The comparators 221 to 223 compare the respective absolute values of the phase currents Iu, Iv, Iw with the continuous energization detection current. When the absolute value of the phase current Iu exceeds the preset continuous energization detection current, the comparator 221 outputs a result of the comparison to the AND gates 232 and 233. When the absolute value of the phase current Iv exceeds the preset continuous energization detection current, the comparator 222 outputs a result of the comparison to the AND gates 232 and 231. When the absolute value of the phase current Iw exceeds the preset continuous energization detection current, the comparator 223 outputs a result of the comparison to the AND gates 231 and 233.

The AND gate 231 outputs "1" when both comparison results of the comparators 222 and 223 are "1", that is, the absolute value of the phase current Iv exceeds the continuous energization detection current and the absolute value of the phase current Iw exceeds the continuous energization detection current. Similarly, the AND gate 232 outputs "1" when both comparison results of the comparators 221 and 222 are "1", that is, the absolute value of the phase current Iu exceeds the continuous energization detection current and the absolute value of the phase current Iv exceeds the continuous energization detection current. The AND gate 233 outputs "1" when both comparison results of the comparators 221 and 223 are "1", that is, the absolute value of the phase current Iu exceeds the continuous energization detection current and the absolute value of the phase current Iw exceeds the continuous energization detection current. The AND gates 231 to 233 output arithmetic results to input terminals In of the timers 251 to 253, and reset terminals Reset of the timers 251 to 253 via the inverters 241 to 243 (see S11 of FIG. 4). In this manner, the timers 251 to 253 start to clock time. The comparators 261 to 263 compare clock time outputs of the timers 251 to 253 with the continuous energization detection time. When clock time outputs of the timers 251 to 253 reach the continuous energization detection time, the comparators 261 to 263 output results of the comparison to the OR gate 264.

As indicated by the area b of FIG. 7, in the present embodiment, two-phase continuous energization is detected (see S11 of FIG. 4) when any two phase currents out of the phase currents Iu, Iv, Iw are high currents which have absolute values exceeding the continuous energization detection current, and the two phase currents continue to be high for a certain amount of time (continuous energization determination time) or longer.

When high currents of two phases continue to flow for a certain amount of time or longer and the absolute value of the slave cylinder S/C stroke is greater than the continuous energization determination stroke, the AND gate 130 inputs continuous energization detection "1" to the input terminal of the switch 131 as well as to the continuous energization detection flag 114. Upon receiving the input, the continuous energization detection flag 114 sets a flag "1" when continuous energization is detected.

The switch 131 receives inputs of a target pressure of brake during commutation detection and an upper limit of the target pressure of brake at normal time. The switch 131 outputs one of the above-mentioned inputs based on the continuous energization detection from the AND gate 130 in a switchable manner. The switch 131 outputs a target pressure during commutation detection in the case of during detection of commutation or outputs a normal upper limit target pressure in the case of normal time in a switchable manner.

The limiter 132 performs rate limiting in the following manner. When the target pressure selected by the switch 131 is within a predetermined range, the limiter 132 outputs a value proportional to an input value of the target pressure. On the other hand, when the target pressure is out of the predetermined range (other than threshold values), the limiter 132 outputs a predetermined value which indicates a saturated value. The slave cylinder S/C target hydraulic pressure output section 113 holds a slave cylinder S/C target hydraulic pressure output [SC_TargetPresLimit].

As indicated by the area c of FIG. 7, in the present embodiment, selection is made between a target pressure during detection of continuous energization and a normal target pressure while the change rate is being regulated by the rate limiting. The target pressure during detection of continuous energization is reduced so as to generate commutation in the electric motor 51 (see S21, S22 of FIG. 5).

FIGS. 8A to 8D are each a timing chart for explaining an operation of the two-phase continuous energization detection logic. FIG. 8A illustrates the state of a continuous energization detection flag ("1" indicates two-phase continuously energized state detection), FIG. 8B illustrates the slave cylinder S/C hydraulic pressure, FIG. 8C illustrates the phase currents Iu, Iv, Iw, and FIG. 8D illustrates the stroke state of the slave cylinder S/C.

As indicated by the area a of FIG. 8D, the two-phase continuous energization detection logic 100, 200 (see FIGS. 6 and 7) determine that two-phase continuous energization is detected when a state, in which the stroke of the slave cylinder S/C is constant, remains for a certain amount of time. In this case, as illustrated in FIG. 8C, two phase high currents out of the phase currents Iu, Iv, Iw continue to flow for a certain amount of time or longer. For example, the phase currents Iv and Iw indicated by the area b of FIG. 8C and the phase currents Iu and Iw indicated by the area d of FIG. 8C are those high currents. It should be noted that the phase currents Iu and Iw indicated by the area c of FIG. 8C are not determined to be two-phase continuous energization detection because the phase currents Iu and Iw do not continue to flow for a certain amount of time or longer even though the phase currents are high currents.

As indicated by the area e of FIG. 8A, when two-phase continuous energization is detected, a continuous energization detection flag "1" is set. As indicated by the area f of FIG. 8B, when two-phase continuous energization is detected, a target pressure of brake is reduced so as to generate commutation of the electric motor 51.

FIGS. 9A to 9D are each a timing chart for explaining verification of the two-phase continuous energization detection logic. FIG. 9A illustrates the state of a continuous energization detection flag ("1" indicates two-phase continuously energized state detection), FIG. 9B illustrates the slave cylinder S/C hydraulic pressure, FIG. 9C illustrates the phase currents Iu, Iv, Iw, and FIG. 9D illustrates the stroke state of the slave cylinder S/C.

As illustrated in FIG. 9A, when a continuous energization detection flag is not set (two-phase continuous energization is not detected), pressure control is performed properly. In this case, two-phase continuously energized state is not assumed, and thus the hydraulic pressure control is not affected. That is, the slave cylinder S/C hydraulic pressure illustrated in FIG. 9B and the stroke state of the slave cylinder S/C illustrated in FIG. 9D are in normal operation. As illustrated in FIG. 9C, two-phase continuously energized state is not assumed in the phase currents Iu, Iv, Iw.

As described above, according to the present embodiment, the brake system 2 for vehicles includes the slave cylinder S/C that generates a hydraulic pressure by the electric motor 51 according to a driver's braking operation, and the control unit 11 that decreases the operation amount of the slave cylinder S/C when the operation amount of the electric motor 51 is maintained, and increases the operation amount of the slave cylinder S/C subsequently when a change in the operation amount of the electric motor 51 occurs. The control unit 11 determines whether or not the phase currents Iu, Iv, Iw of the electric motor 51 are in two-phase continuously energized state, and the state remains for a certain amount of time or longer. When the determination conditions are satisfied, the control unit 11 performs commutation control to generate commutation in the electric motor 51 by reducing a target hydraulic pressure of the slave cylinder S/C. For the commutation control, the control unit 11 may execute a control program or implement a control logic by a hardware configuration.

With this configuration, when it is detected that two-phase continuously energized state has remained for a certain amount of time or longer, a target pressure of brake is reduced and the electric motor 51 is reliably caused to rotate, thereby changing a current flowing phase (commutation) so as to be able to reduce heat generation. That is, reduction in a desired braking force can be prevented when a conventional phenomenon occurs such as a constant pattern of the phase current of the electric motor 51 and heat generation occurs in the electric motor 51.

In the present embodiment, when the operation amount of the slave cylinder S/C is decreased at a time when the operation amount reaches nearly a maximum operation amount, thereby being able to reduce substantially the highest heat generation at a time of nearly a maximum operation amount. A driver demands a greater braking force near a maximum operation amount of the slave cylinder S/C, and thus reduction in braking force due to the heat generation can be effectively prevented.

In the present embodiment, when ABS control is started, decrease in the operation amount of the slave cylinder S/C is prohibited, and reduced pressure due to ABS control is thereby not to interfere with decrease in the operation amount of the slave cylinder S/C.

In the present embodiment, when the amount of brake operation by a driver is increased while the operation amount of the slave cylinder S/C is being reduced, decrease in the operation amount of the slave cylinder S/C can be prohibited, thereby making it possible to prevent reduction in braking force when the driver actually intends to apply brake, for example, by further stepping on the brake pedal.

In the present braking method (braking system), the configuration, in which braking force is provided based on the power of the electric motor 51 only, has been described as an example. However, the braking system is not limited to this and may have a configuration in which regenerative braking force is used in addition to the braking force by the hydraulic pressure (hydraulic braking force). For example, the control unit 11 calculates a braking force by regenerative power (regenerative braking force) based on the amount of brake operation, the amount of electricity (electric charge, power) stored in a high voltage battery (not illustrated), and the maximum value of the current charging current. The control unit 11 further calculates a hydraulic braking force by subtracting the calculated regenerative braking force from the total braking force. In this manner, a hydraulic braking force is set (distributed) by taking the regenerative braking force into consideration, and thus the hydraulic braking force can be reduced and it is possible to reduce the power consumption of the electric motor 51. This distribution method is just an example and without being limited to this, various distribution methods may be applicable.

The above-described embodiment example has been described in detail in order to facilitate understanding of the present disclosure, and the present disclosure is not necessarily limited to the braking system having all the configurations described. Part of the configuration of an embodiment example may be replaced by the configuration of another embodiment example, and the configuration of another embodiment example may be added to the configuration of an embodiment example. Furthermore, addition, deletion, replacement of another configuration may be made on part of the configuration of an embodiment example.

We claim:

1. An electric brake apparatus, comprising:
    an electric hydraulic pressure generating device configured to generate a hydraulic pressure by a three-phase electric motor according to a braking operation by a driver; and
    a controller configured to, when it is determined that the electric motor is in two-phase continuously energized state in which a current continuously flows through same two phases out of three phases of currents driving the electric motor, decrease an operation amount of the electric hydraulic pressure generating device,
    wherein the two-phase continuously energized state is a state in which a certain time has elapsed while the electric hydraulic pressure generating device is generating the hydraulic pressure even though the electric motor is not rotating,
    wherein the electric hydraulic pressure generating device includes a cylinder and a piston, and
    wherein when it is determined that the electric motor is in the two-phase continuously energized state, the controller determines whether an operation amount of the piston in the cylinder is at maximum level, and if not, the controller does not decrease the operation amount of the electric hydraulic pressure generating device until the operation amount of the piston in the cylinder reaches the maximum level.

2. The electric brake apparatus according to claim 1, wherein in a case where the operation amount of the electric hydraulic pressure generating device is decreased by the controller, the controller decreases the operation amount at a time when the operation amount reaches nearly a maximum operation amount.

3. The electric brake apparatus according to claim 1, wherein when anti-lock brake control is started, the controller prohibits decreasing of the operation amount of the electric hydraulic pressure generating device.

4. The electric brake apparatus according to claim 1, wherein when an amount of brake operation of a driver is increased while the controller decreasing the operation amount of the electric hydraulic pressure generating device, the controller prohibits decreasing of the operation amount of the electric hydraulic pressure generating device.

5. The electric brake apparatus according to claim 1, wherein elapse of a predetermined time or longer during which the operation amount of the electric motor is maintained is the case where the operation amount of the electric hydraulic pressure generating device is to be decreased by the controller, and the predetermined time is set to be longer when heat generation of the electric motor is lower or a hydraulic pressure output of the electric hydraulic pressure generating device is lower.

6. The electric brake apparatus according to claim 1, wherein when it is detected that a drive current of the electric motor remains to be in the two-phase continuously energized state for a certain time or longer, the controller reduces a target pressure of the electric hydraulic pressure generating device so as to generate commutation in the electric motor.

7. The electric brake apparatus according to claim 1, wherein the controller decreases the operation amount of the electric hydraulic pressure generating device by reducing a target pressure of the electric hydraulic pressure generating device.

8. The electric brake apparatus according to claim 1, wherein in a case where the operation amount of the electric hydraulic pressure generating device is decreased by the controller, the controller decreases the operation amount at a time only when the operation amount is determined to be at or close to a maximum operation amount.

9. An electric brake apparatus, comprising:
    an electric hydraulic pressure generating device configured to generate a hydraulic pressure by a three-phase electric motor according to a braking operation by a driver; and
    a control circuit configured to, when it is determined that the electric motor is in two-phase continuously energized state in which a current continuously flows through same two phases out of three phases of currents driving the electric motor, decrease an operation amount of the electric hydraulic pressure generating device,
    wherein the two-phase continuously energized state is a state in which a certain time has elapsed while the electric hydraulic pressure generating device is generating the hydraulic pressure even though the electric motor is not rotating,
    wherein the electric hydraulic pressure generating device includes a cylinder and a piston, and
    wherein when it is determined that the electric motor is in the two-phase continuously energized state, the control circuit determines whether an operation amount of the piston in the cylinder is at maximum level, and if not, the control circuit does not decrease the operation amount of the electric hydraulic pressure generating device until the operation amount of the piston in the cylinder reaches the maximum level.

10. The electric brake apparatus according to claim 9, wherein in a case where the operation amount of the electric hydraulic pressure generating device is decreased by the control circuit, the control circuit decreases the operation amount at a time when the operation amount reaches nearly a maximum operation amount.

11. The electric brake apparatus according to claim 9, wherein when anti-lock brake control is started, the control circuit prohibits decreasing of the operation amount of the electric hydraulic pressure generating device.

12. The electric brake apparatus according to claim 9, wherein when an amount of brake operation of a driver is increased while the control circuit decreasing the operation amount of the electric hydraulic pressure generating device, the control circuit prohibits decreasing of the operation amount of the electric hydraulic pressure generating device.

13. The electric brake apparatus according to claim 9, wherein elapse of a predetermined time or longer during which the operation amount of the electric motor is maintained is the case where the operation amount of the electric hydraulic pressure generating device is to be decreased by the control circuit, and the predetermined time is set to be longer when heat generation of the electric motor is lower or a hydraulic pressure output of the electric hydraulic pressure generating device is lower.

14. The electric brake apparatus according to claim 9, wherein when it is detected that a drive current of the electric motor remains to be in the two-phase continuously energized state for a certain time or longer, the control circuit reduces a target pressure of the electric hydraulic pressure generating device so as to generate commutation in the electric motor.

15. The electric brake apparatus according to claim 9, wherein the control circuit decreases the operation amount of the electric hydraulic pressure generating device by reducing a target pressure of the electric hydraulic pressure generating device.

16. The electric brake apparatus according to claim 9, wherein in a case where the operation amount of the electric hydraulic pressure generating device is decreased by the control circuit, the control circuit decreases the operation amount at a time only when the operation amount is determined to be at or close to a maximum operation amount.

* * * * *